US012775061B2

(12) United States Patent
Chujo

(10) Patent No.: US 12,775,061 B2
(45) Date of Patent: Oct. 27, 2026

(54) RADAR DEVICE

(71) Applicant: HITACHI ASTEMO, LTD., Hitachinaka (JP)

(72) Inventor: Norio Chujo, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 295 days.

(21) Appl. No.: 18/563,493

(22) PCT Filed: Feb. 8, 2022

(86) PCT No.: PCT/JP2022/004981
§ 371 (c)(1),
(2) Date: Nov. 22, 2023

(87) PCT Pub. No.: WO2022/269981
PCT Pub. Date: Dec. 29, 2022

(65) Prior Publication Data

US 2024/0272274 A1 Aug. 15, 2024

(30) Foreign Application Priority Data

Jun. 23, 2021 (JP) ................................ 2021-104438

(51) Int. Cl.
*G01S 7/03* (2006.01)
*G01S 13/931* (2020.01)

(52) U.S. Cl.
CPC ............... *G01S 7/03* (2013.01); *G01S 13/931* (2013.01); *G01S 2013/9315* (2020.01); *G01S 2013/93274* (2020.01)

(58) Field of Classification Search
CPC ............... G01S 7/03; G01S 2013/9315; G01S 2013/93274; G01S 13/931
See application file for complete search history.

(56) References Cited

U.S. PATENT DOCUMENTS 5,337,066 A * 8/1994 Hirata .................. H01Q 17/001 343/793
7,126,525 B2 * 10/2006 Suzuki ................. H01Q 17/001 342/175

(Continued)

FOREIGN PATENT DOCUMENTS

JP 2004-101450 A 4/2004
JP 3684948 B2 * 8/2005

(Continued)

OTHER PUBLICATIONS

JP_3684948_B2_I_translate.pdf (Year: 2005).*

(Continued)

*Primary Examiner* — Yonghong Li
(74) *Attorney, Agent, or Firm* — Foley & Lardner LLP

(57) ABSTRACT

A radar device includes an antenna substrate having a transmission antenna and a reception antenna, and a radio wave absorber, in which the radar device detects an object by the reception antenna receiving a reflected radio wave obtained by reflecting a radio wave transmitted from the transmission antenna by the object outside the vehicle, a detection area that is a detection target range of the object and a non-detection area that is not a detection target range of the object are set within a range of a viewing angle of the radar device, the radio wave absorber includes a first radio wave absorber and a second radio wave absorber, the first radio wave absorber is disposed so as to at least partially reside within the non-detection area, and the second radio wave absorber is disposed to face the first radio wave absorber.

7 Claims, 12 Drawing Sheets

(56) References Cited

U.S. PATENT DOCUMENTS

| | | | | |
|---|---|---|---|---|
| 7,408,500 | B2 * | 8/2008 | Shinoda | H01Q 1/3283 342/70 |
| 9,610,912 | B2 * | 4/2017 | Schaaf | B60R 19/483 |
| 9,640,873 | B2 * | 5/2017 | Pfitzenmaier | H01Q 17/001 |
| 9,991,604 | B2 * | 6/2018 | John | H01Q 17/00 |
| 10,074,907 | B2 * | 9/2018 | Ding | G01S 7/03 |
| 10,516,217 | B2 * | 12/2019 | Fujita | H01Q 1/526 |
| 2016/0056539 | A1 | 2/2016 | Fujita et al. | |
| 2016/0268693 | A1 | 9/2016 | Ding et al. | |
| 2017/0350580 | A1 | 12/2017 | Honda et al. | |
| 2022/0003833 | A1 | 1/2022 | Arakawa et al. | |

FOREIGN PATENT DOCUMENTS

| | | | |
|---|---|---|---|
| JP | 2017-220316 | A | 12/2017 |
| JP | 2021-038984 | A | 3/2021 |
| WO | WO-2014/148597 | A1 | 9/2014 |
| WO | WO-2020/195989 | A1 | 10/2020 |

OTHER PUBLICATIONS

Japanese Office Action issued in corresponding JP Application No. 2021-104438, dated Oct. 8, 2024 with English translation (12 pages).

International Search Report with English Translation and Written Opinion dated Apr. 5, 2022 in corresponding International Patent Application No. PCT/JP2022/004981 (9 pages).

* cited by examiner

RADAR DEVICE

TECHNICAL FIELD

The present invention relates to a radar device.

BACKGROUND ART

In ADAS (driving assistance) and AD (automatic driving), it is necessary to recognize the environment around the vehicle by a sensor over 360 degrees. In order to cope with this, a millimeter wave radar mounted on a vehicle detects a long-range environment, and an LRR (Long Range Radar) installed in front of the vehicle and an MRR (Mid Range Radar) installed in a corner portion of the vehicle at a middle distance are used in combination. The MRR requires a wide viewing angle (field of view: FOV) of ±75 degrees to cover the periphery of the vehicle. In addition, in order to prevent foreign matter from being caught in the vehicle, it has been studied to install a radar not only in the front but also on the side. Demand for side radars is increasing to eliminate such blind spots.

As a background art of the present invention, PTL 1 below describes a technique in which a shielding plate or a radio wave absorbing material is provided between a radio wave radar and a radiator fan located behind the radio wave radar to prevent a side lobe radiated from the radio wave radar from being reflected by a body of a vehicle to reach the radiator fan, so that a radio wave absorber is provided between an object that reflects a radio wave and the radar to attenuate an extra radio wave (side lobe).

CITATION LIST

Patent Literature

PTL 1: JP 2004-101450 A

SUMMARY OF INVENTION

Technical Problem

In the configuration described in PTL 1, when an extra transmission radio wave outside the detection area is reflected by the radio wave absorber, the extra transmission radio wave is further reflected by a radar installation plate, a structure, or the like, and returns to the antenna. This reflected wave is mixed with the radio wave from the target, and a problem of deteriorating radar performance occurs. Based on this, an object of the present invention is to provide a radar device with improved reliability.

Solution to Problem

A radar device of the present invention is a radar device mounted on a vehicle, the radar device including: an antenna substrate on which a transmission antenna and a reception antenna are mounted; and a radio wave absorber, in which the radar device detects an object by the reception antenna receiving a reflected radio wave obtained by reflecting a radio wave transmitted from the transmission antenna by the object outside the vehicle, a detection area that is a detection target range of the object and a non-detection area that is not a detection target range of the object are set within a range of a viewing angle of the radar device, the radio wave absorber includes a first radio wave absorber and a second radio wave absorber, the first radio wave absorber is disposed so as to at least partially reside within the non-detection area, and the second radio wave absorber is disposed to face the first radio wave absorber.

Advantageous Effects of Invention

According to the present invention, it is possible to provide a radar device with improved reliability.

Figure 1:
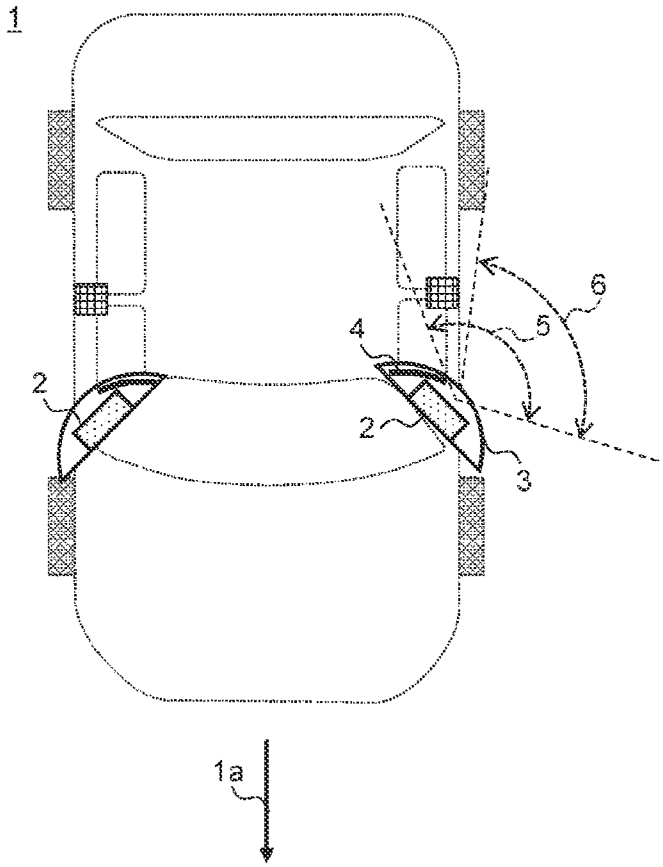
FIG. 1 is an external view of a vehicle employing a radar device of the present invention.

Hereinafter, embodiments of the present invention will be described with reference to the drawings. The following description and drawings are examples for describing the present invention, and are omitted and simplified as appropriate for the sake of clarity of description. The present invention can be carried out also in various other forms. Unless otherwise specified, each component may be singular or plural.

The positions, sizes, shapes, ranges, and the like of the components shown in the drawings may not represent actual positions, sizes, shapes, ranges, and the like in order to facilitate understanding of the invention. For this reason, the present invention is not necessarily limited to the position, size, shape, range, and the like disclosed in the drawings.

(Overall Configuration of Device Provided with First Embodiment and Present Invention)

FIG. 1 is an external view of a vehicle employing a radar device of the present invention.

A vehicle 1 includes side radar devices 2 on left and right side surfaces, respectively. Note that the vehicle 1 is described with a vehicle traveling direction 1*a* as a downward side. The side radar device 2 is attached with a cover 3 and has a constant viewing angle 5 via the cover 3. A certain range of the viewing angle 5 of the side radar device 2 for capturing an obstacle near the side surface of the vehicle 1 is a detection area 6. A radio wave absorber 4 is disposed on the wall surface of the cover 3 to prevent the influence of radio waves in an area outside the detection area 6 (details will be described later).

Figure 2:
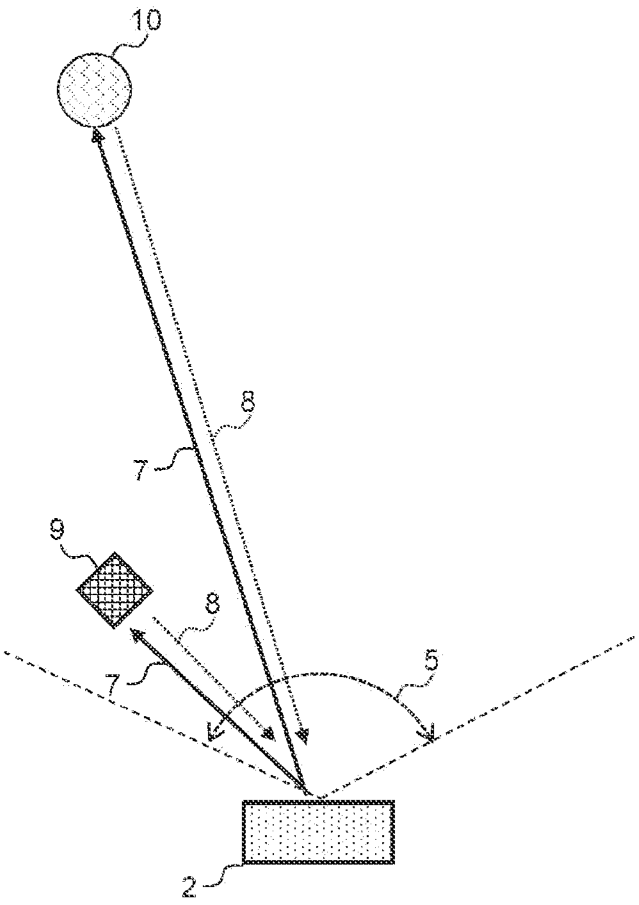
FIG. 2 is a characteristic of a side radar provided in a vehicle.
Figure 3:
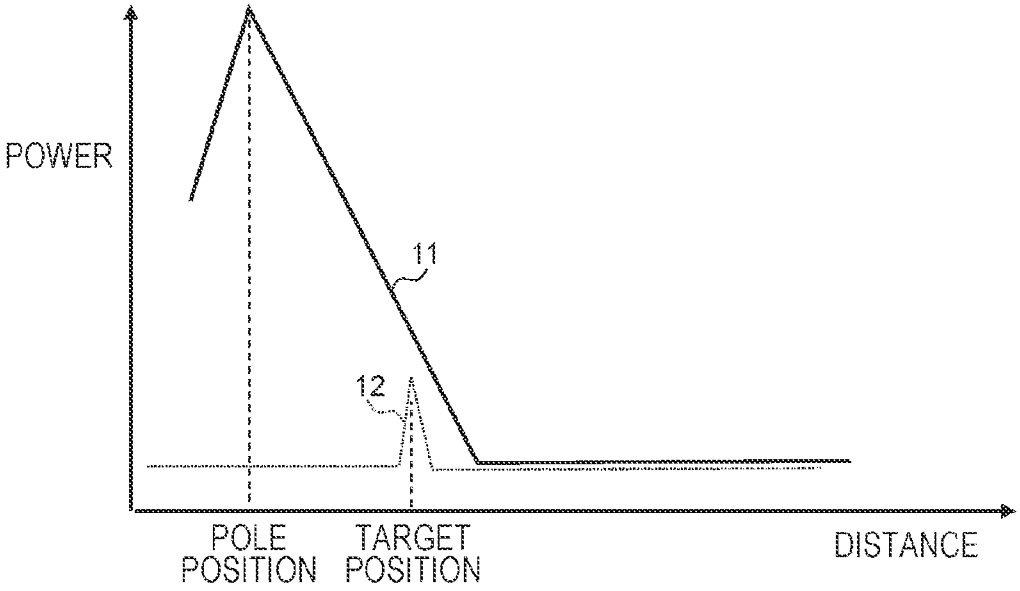
FIG. 3 illustrates characteristics of a side radar with and without a structure.

FIG. 2 is a diagram illustrating features of the side radar 2. FIG. 3 is a graph for explaining features of the side radar with and without a structure.

When a transmission radio wave 7 transmitted by the side radar 2 from the transmission antenna hits a target 10 to be detected, the transmission radio wave 7 returns to the side radar 2 as a reflected radio wave 8. By receiving the reflected radio wave 8 by the reception antenna, the side radar device 2 detects the target 10. However, as illustrated in FIG. 2, when there is a structure 9 (such as a pole) other than the target 10, the transmission radio wave 7 similarly hits the structure 9 and returns to the side radar 2 as the reflected radio wave 8, which affects the signal from the target 10. As a result, the detection accuracy of the position and angle of the target 10 is deteriorated in the side radar 2, and there is a possibility that the target 10 cannot be detected.

Specifically, for example, as illustrated in FIG. 3, there is a problem that the peak indicating the target position by a reception power 12 of the reflected wave from the target 10 is hidden by a reception power 11 of the reflected wave from the structure 9 other than the target 10, and the target position cannot be determined.

Figure 4:
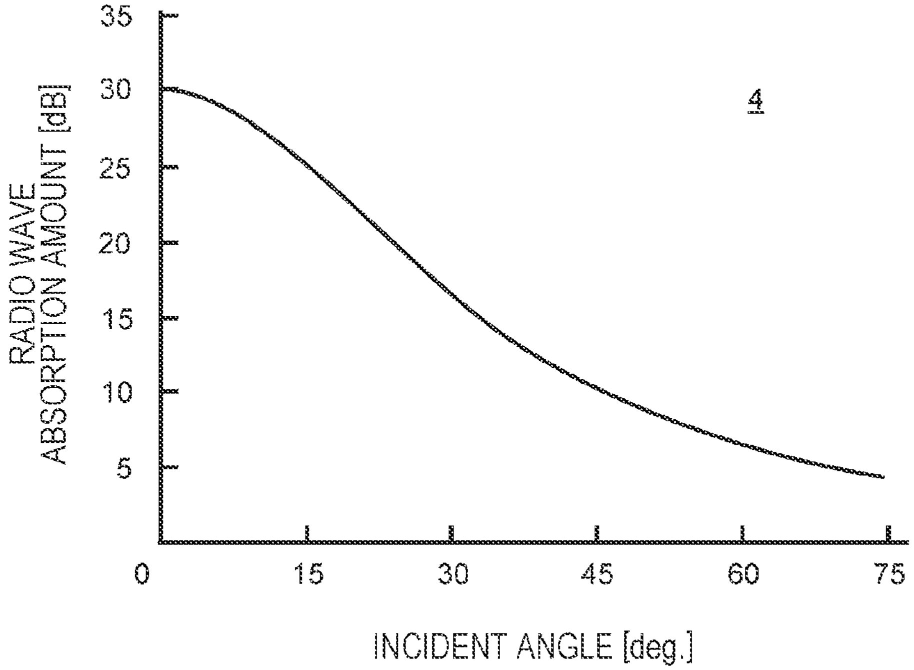
FIG. 4 is a graph illustrating a radio wave absorption amount of a radio wave absorber.
Figure 5:
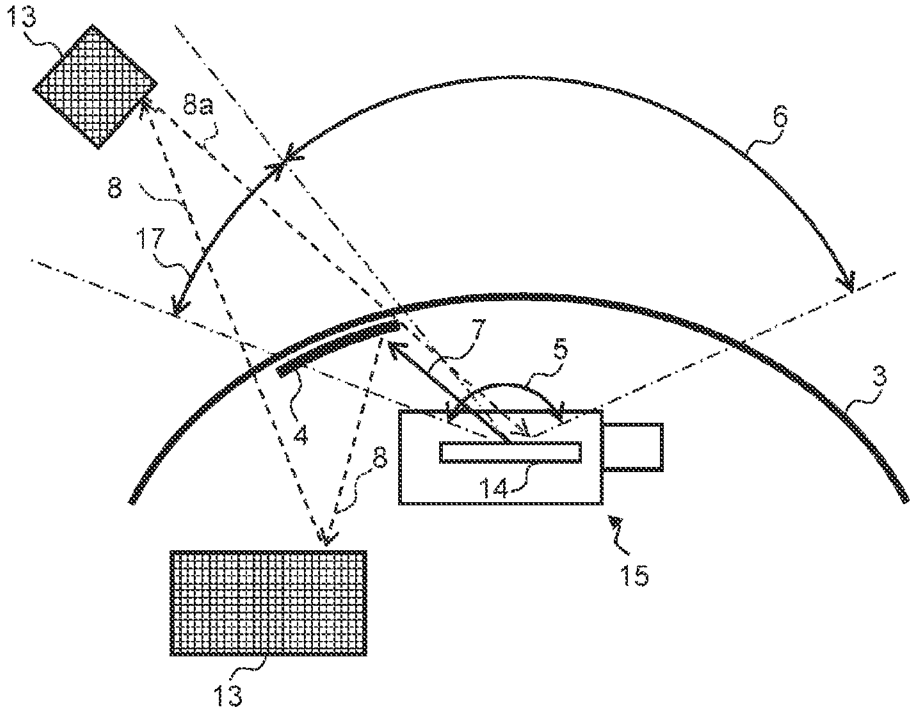
FIG. 5 is an example of an installation position of a conventional radio wave absorber.

FIG. 4 is a graph illustrating a radio wave absorption amount of the radio wave absorber. FIG. 5 is a diagram illustrating an example of an installation position of a conventional radio wave absorber.

A millimeter wave radar 15 including an antenna substrate 14 shows details of the side radar device 2 shown in FIGS. 1 and 2. Within the range of the viewing angle 5, there are the detection area 6 that is the detection target range of the target 10 and a non-detection area 17 that is not the detection target range of the target 10 (FIG. 5). In order to eliminate the influence on the target, the transmission radio wave 7 passing through the non-detection area 17 is absorbed by the radio wave absorber 4 provided within the cover 3 so that at least a part of the radio wave absorber 4 resides in the non-detection area 17. The radio wave absorber 4 requires attenuation (absorption amount) of 30 dB or more in radio wave non-transmission, and the λ/4 type radio wave absorber 4 (radio wave non-transmission and large attenuation characteristics) coated on the back surface is a candidate.

However, the back coated λ/4 type radio wave absorber 4 has large frequency dependence and angle dependence, and the attenuation rate of the radio wave greatly decreases when the incident angle of the transmission radio wave 7 is 15 degrees or more (FIG. 4). Therefore, there is a case where the transmission radio wave 7 passing through the non-detection area 17 cannot be sufficiently absorbed, and the transmission radio wave 7 that has not been absorbed becomes the reflected radio wave 8 and hits another structure 13 (chassis or the like) a plurality of times and is reflected, so that the transmission radio wave 7 returns to the antenna substrate 14 side like a reflected radio wave 8*a*. On the antenna substrate 14, a transmission antenna for transmitting the transmission radio wave 7 and a reception antenna for receiving the reflected radio wave 8 from the target 10 are mounted, and the viewing angle 5 of the side radar device 2 is determined according to the directivity of the transmission antenna or the reception antenna. Here, when the reflected radio wave 8*a* from the structure 13 other than the target 10 is received by the reception antenna, the detection accuracy is deteriorated as described above. As a result, there is a problem that the detection accuracy of the position and angle of the target is deteriorated even though the radio wave absorber 4 is provided.

Figure 6:
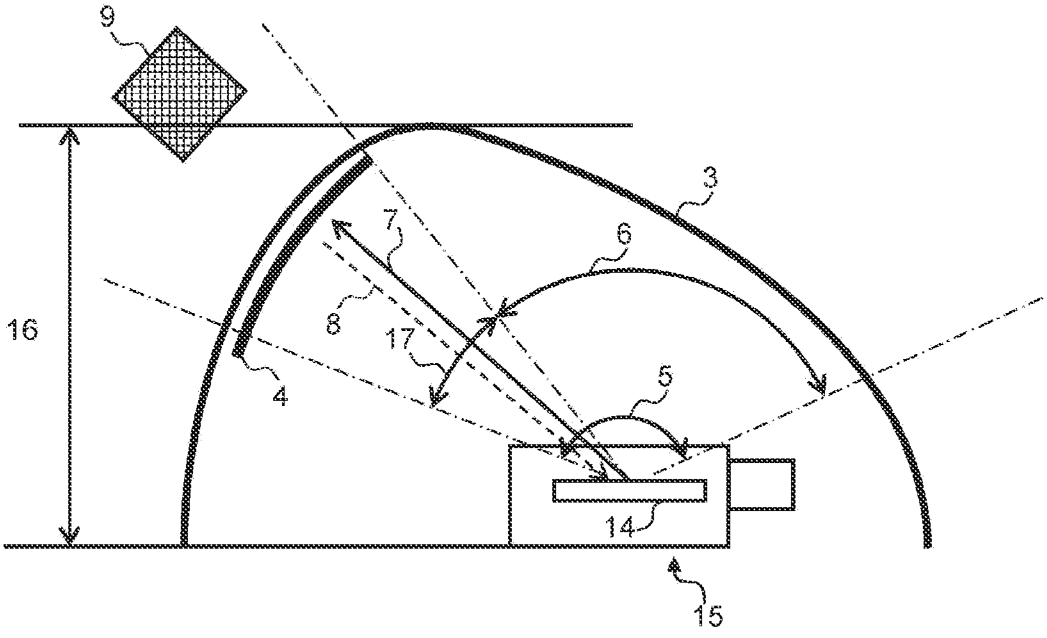
FIG. 6 illustrates a problem of a side radar device according to a conventional example different from FIG. 5.

FIG. 6 is a diagram for explaining a problem of a side radar device according to a conventional example different from FIG. 5.

In the conventional example of FIG. 6, in order to prevent the generation of the reflected radio wave 8*a* described in FIG. 5, the above-described radio wave absorber 4 is disposed on the cover 3 so that the incident angle of the transmission radio wave 7 is substantially perpendicular (incident angle: 0 degrees). However, as illustrated in FIG. 4, the radio wave absorber 4 has an attenuation capability close to 30 dB near the incident angle of 0 degrees, but it is difficult to absorb all the power of the transmission radio wave 7 at a time. Therefore, a part of the transmission radio wave 7 that has not been absorbed by the radio wave absorber 4 returns to the antenna substrate 14 side as the reflected radio wave 8, which affects the performance of the radar. In addition, in order to receive the radio wave 7 substantially perpendicularly (at an incident angle of 0 degrees), when the arrangement of the radio wave absorber 4 as illustrated in FIG. 6 is implemented in the cover 3, a large space is required for the cover 3, and the cover 3 spreads to the lateral outside (upper side in the drawing) of the vehicle 1, so that a cover height 16 increases. This also causes a problem in the area of the radio wave absorber 4 to be disposed.

Figure 7:
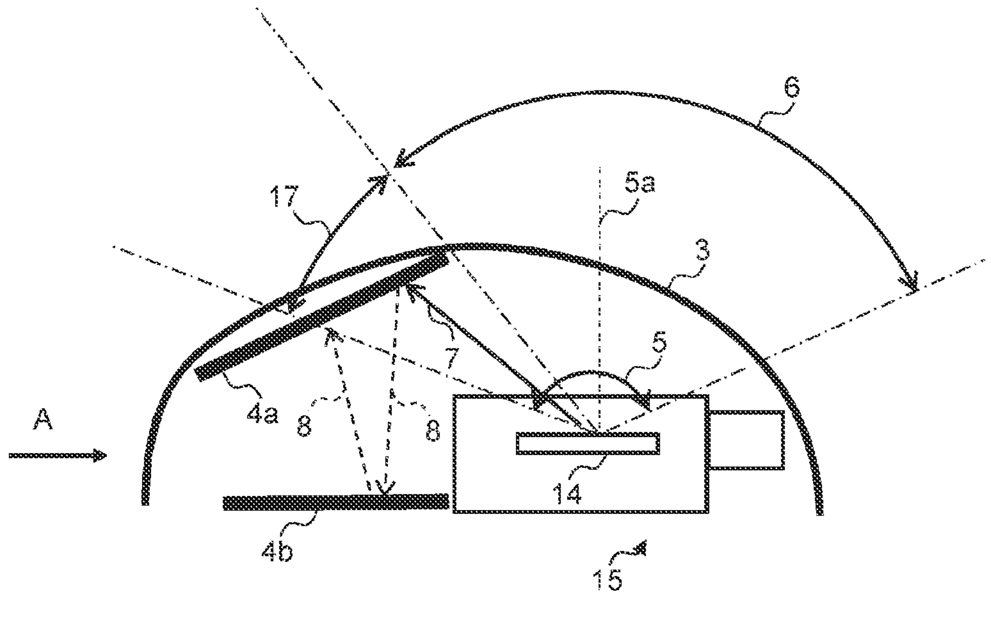
FIG. 7 is a diagram illustrating a radar device according to a first embodiment of the present invention.

FIG. 7 is a diagram illustrating the radar device according to the first embodiment of the present invention.

The radar device according to the present embodiment includes a side radar device (millimeter wave radar 15) similar to that described with reference to FIGS. 5 and 6, and a cover 3 having a shape different from those in FIGS. 5 and 6. A first radio wave absorber 4*a* is provided inside the cover 3 of the present embodiment so as to shield radio waves passing through the non-detection area 17. The first radio wave absorber 4*a* is disposed in such a direction that the transmission radio wave 7 passing through the non-detection area 17 is reflected in a direction opposite to the detection area 6 with respect to the antenna substrate 14 in the millimeter wave radar 15. Further, a second radio wave absorber 4*b* is disposed facing the first radio wave absorber 4*a* in such a direction that the reflected radio wave 8 from the first radio wave absorber 4*a* is similarly reflected to the side opposite to the detection area 6. Specifically, the first radio wave absorber 4*a* and the second radio wave absorber 4*a* are disposed so as to reflect the reflected radio waves 8 that cannot be absorbed in a direction parallel to or away from a viewing angle center line 5*a* of the antenna substrate 14 when reflecting the reflected radio waves 8 toward each other.

The first radio wave absorber 4*a* and the second radio wave absorber 4*b* are non-parallel to each other, and are disposed so that a distance on a side close to the antenna substrate 14 is larger than a distance on a side far from the antenna substrate 14. In addition, the first radio wave absorber 4*a* is disposed so that at least a part of the first radio wave absorber 4*a* resides in the non-detection area 17, and the first radio wave absorber 4*a* is extended toward a side opposite to the detection area 6 so that all reflected waves from the second radio wave absorber 4*b* hit the first radio wave absorber 4*a*. As a result, the transmission radio wave 7 and the reflected radio wave 8 thereof hit the radio wave absorbers 4*a* and 4*b* a plurality of times to increase the radio wave absorption amount, so that a sufficient absorption effect is exhibited, and the influence on the reflected radio wave from the target 10 present in the detection area 6 is prevented.

In this way, the influence of the structure outside the detection area 6 can be eliminated, and the position and angle accuracy can be improved. Furthermore, the second radio wave absorber 4*b* can reduce the height and size of the cover 3 while maintaining the radio wave absorbing power. Even when the cover 3 receives an impact or is deformed due to aged deterioration, the same effect can be maintained as long as the positional relationship between the first radio wave absorber 4*a* and the second radio wave absorber 4*b* can be maintained.

Figure 8:
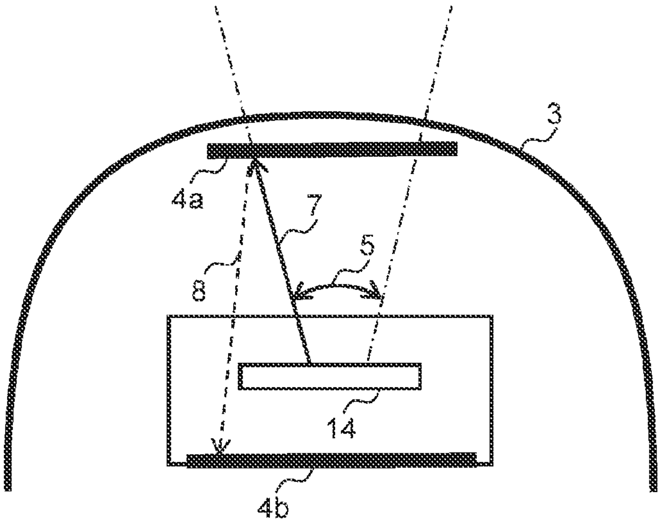
FIG. 8 is a front view as viewed from direction A in FIG. 7.

FIG. 8 is a front view as viewed from direction A in FIG. 7.

In the radar device 2, when viewed from the front direction of the vehicle 1, the width of the second radio wave absorber 4*b* is formed to be wider than the width of the first radio wave absorber 4*a*. In this way, the reflected radio wave 8 from the first radio wave absorber 4*a* can be absorbed by the second radio wave absorber 4*b* without leakage.

Figure 9:
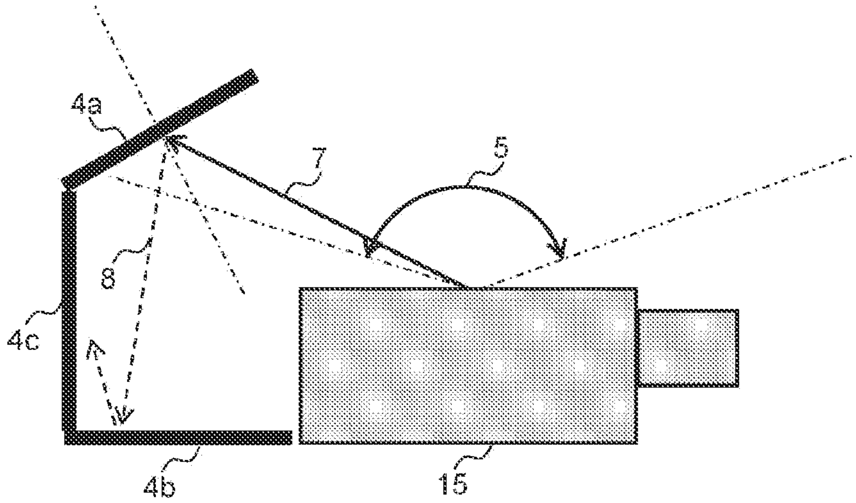
FIG. 9 is a radar device according to a second embodiment of the present invention.

FIG. 9 is a diagram illustrating a radar device according to a second embodiment of the present invention.

The radar device 2 of the present embodiment includes a third radio wave absorber 4*c* in addition to the first radio wave absorber 4*a* and the second radio wave absorber 4*b*. The third radio wave absorber 4*c* connects the first radio wave absorber 4*a* and the second radio wave absorber 4*b*. With this configuration, the respective cover widths can be reduced, which contributes to miniaturization of the entire radar device 2 while reliably absorbing the reflected radio waves 8. Although the cover 3 is not illustrated in FIG. 9, in the radar device 2 of the present embodiment, the first radio wave absorber 4*a*, the second radio wave absorber 4*b*, and the third radio wave absorber 4*c* are disposed in the cover 3 in a positional relationship as illustrated in FIG. 9.

Figure 10:
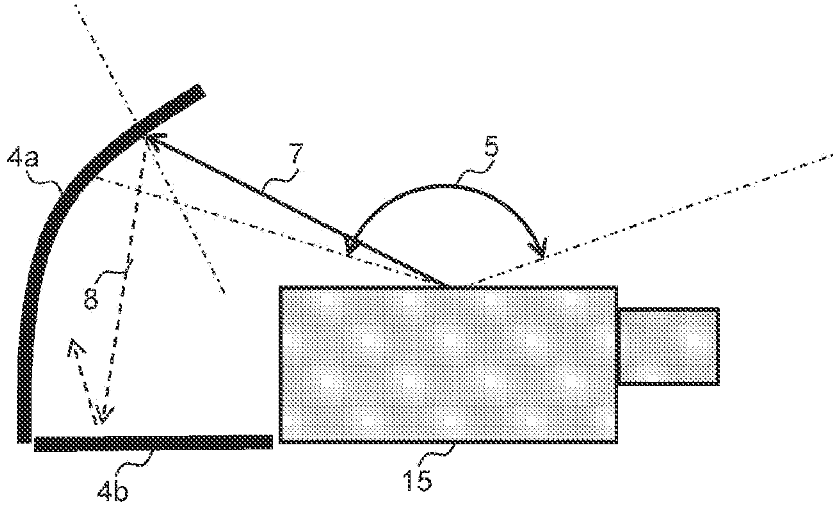
FIG. 10 is a radar device according to a third embodiment of the present invention.

FIG. 10 is a radar device according to a third embodiment of the present invention.

The first radio wave absorber 4*a* included in the radar device 2 of the present embodiment is disposed to be curved so as to be connected to the second radio wave absorber 4*b*, so that the two radio wave absorbers can reliably absorb the reflected radio wave 8. Although the cover 3 is not illustrated in FIG. 10 as in FIG. 9, in the radar device 2 of the present embodiment, the first radio wave absorber 4*a* and the second radio wave absorber 4*b* are disposed in the cover 3 in a positional relationship as illustrated in FIG. 10.

Figure 11:
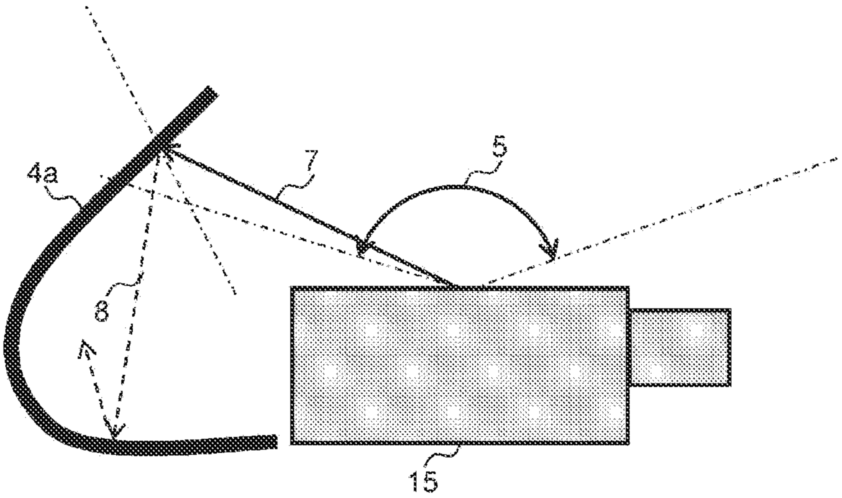
FIG. 11 is a radar device according to a fourth embodiment of the present invention.

FIG. 11 is a radar device according to a fourth embodiment of the present invention.

The first radio wave absorber 4*a* included in the radar device 2 of the present embodiment is disposed to be curved and extended to the position where the second radio wave absorber 4*b* is disposed in FIGS. 7, 9, and 10, so that the reflected radio wave 8 can be reliably absorbed by one member. Although the cover 3 is not illustrated in FIG. 11 similarly to FIGS. 9 and 10, in the radar device 2 of the present embodiment, the first radio wave absorber 4*a* and the second radio wave absorber 4*b* are disposed in the cover 3 in a positional relationship as illustrated in FIG. 11.

Figure 12:
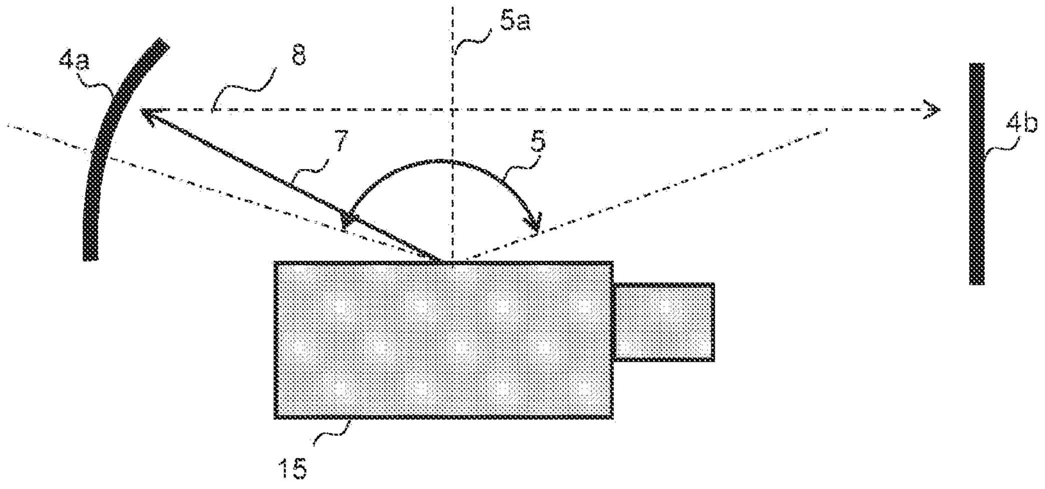
FIG. 12 is a radar device according to a fifth embodiment of the present invention.

FIG. 12 is a radar device according to a fifth embodiment of the present invention.

The first radio wave absorber 4*a* is disposed so that a direction thereof is parallel to the antenna substrate 14 (not illustrated) installed in the millimeter wave radar 15 when the reflected radio wave 8 that cannot be absorbed is reflected by the second radio wave absorber 4*b*. On the other hand, the second radio wave absorber 4*b* is disposed parallel to the viewing angle center line 5*a*. As a result, the reflected radio wave 8 can be reliably hit to the second radio wave absorber 4*b* at an angle perpendicular or nearly perpendicular to the second radio wave absorber 4*b* to increase the radio wave absorption amount, and the height of the vehicle 1 in the vehicle width direction (upward direction in the drawing) can be suppressed to contribute to downsizing of the vehicle. Although not parallel to the viewing angle center line 5*a*, the second radio wave absorber 4*b* may be disposed in a direction in which the radio wave absorption amount by the second radio wave absorber 4*b* is maximized.

Although the cover 3 is not illustrated in FIG. 12 similarly to FIGS. 9 to 11, in the radar device 2 of the present embodiment, the first radio wave absorber 4*a* and the second radio wave absorber 4*b* are disposed in the cover 3 in a positional relationship as illustrated in FIG. 12.

According to the embodiment of the present invention described above, the following operational effects are obtained.

(1) A radar device 2 mounted on a vehicle 1, the radar device including: an antenna substrate 14 on which a transmission antenna and a reception antenna are mounted; and a radio wave absorber 4, in which the radar device 2 detects an object 10 by the reception antenna receiving a reflected radio wave 8 obtained by reflecting a radio wave 7 transmitted from the transmission antenna by the object 10 outside the vehicle 1, a detection area 6 that is a detection target range of the object 10 and a non-detection area 17 that is not a detection target range of the object 10 are set within a range of a viewing angle 5 of the radar device 2, the radio wave absorber 4 includes a first radio wave absorber 4*a* and a second radio wave absorber 4*b*, the first radio wave absorber 4*a* is disposed so as to at least partially reside within the non-detection area 17, and the second radio wave absorber 4*b* is disposed to face the first radio wave absorber 4*a*. With this configuration, it is possible to provide a radar device with improved reliability.

(2) The first radio wave absorber 4*a* and the second radio wave absorber 4*b* are non-parallel to each other, and are disposed so that a distance between the first radio wave absorber 4*a* and the second radio wave absorber 4*b* on a side close to the antenna substrate 14 is larger than a distance on a side far from the antenna substrate 14. With this configuration, the transmission radio wave 7 and the reflected radio wave 8 thereof hit the radio wave absorbers 4*a* and 4*b* a plurality of times to increase the radio wave absorption amount, so that a sufficient absorption effect can be exhibited.

(3) When viewed from the front of the vehicle 1, a width of the second radio wave absorber 4*b* is larger than a width of the first radio wave absorber 4*a*. With this configuration, the reflected radio wave 8 from the first radio wave absorber 4*a* can be absorbed by the second radio wave absorber 4*b* without leakage.

(4) The first radio wave absorber 4*a* is disposed in a direction in which a direction of reflecting the radio wave transmitted from the transmission antenna is parallel to or away from the center line 5*a* of the viewing angle. With this configuration, the reflected radio wave 8 is prevented from hindering detection of target 10 toward the antenna substrate 14.

(5) The radio wave absorber 4 further includes a third radio wave absorber 4*c* between the first radio wave absorber 4*a* and the second radio wave absorber 4*b*, and the third radio wave absorber 4*c* connects the first radio wave absorber 4*a* and the second radio wave absorber 4*b*. With this configuration, the respective cover widths can be reduced, which contributes to miniaturization of the entire radar device 2 while reliably absorbing the reflected radio wave 8.

(6) The first radio wave absorber 4*a* is disposed so that a direction in which the radio wave 7 transmitted from the transmission antenna is reflected is parallel to the antenna substrate 14, and the second radio wave absorber 4*b* is disposed parallel to a center line 5*a* of the viewing angle. With this configuration, the radio wave absorption amount can be increased, and the height of the vehicle 1 in the vehicle width direction can be suppressed to contribute to downsizing of the vehicle.

(7) The second radio wave absorber 4*b* is disposed in a direction in which an absorption amount of the radio wave reflected by the first radio wave absorber 4*a* is maximized. With this configuration, the radio wave absorption amount can be increased.

Note that the present invention is not limited to the above embodiments, and various modifications and other configurations can be combined within a range not departing from the gist of the present invention. In addition, the present invention is not limited to one including all the configurations described in the above embodiments, and also includes one in which a part of the configuration is deleted.

REFERENCE SIGNS LIST

1 vehicle
1*a* vehicle traveling direction
2 side radar device
3 cover
4 radio wave absorber
4*a* first radio wave absorber
4*b* second radio wave absorber
4*c* third radio wave absorber
5 viewing angle
5*a* viewing angle center line
6 detection area
7 transmission radio wave
8 reflected radio wave
8*a* reflected radio wave returning to millimeter wave radar
9 structure (pole)
10 target
11 reception power with structure (pole)
12 reception power without structure (pole)
13 structure (chassis or the like)
14 antenna substrate
15 millimeter wave radar
16 cover height
17 non-detection area

The invention claimed is:

1. A radar device mounted on a vehicle, the radar device comprising:

an antenna substrate on which a transmission antenna and a reception antenna are mounted; and a radio wave absorber, wherein the radar device detects an object by the reception antenna receiving a reflected radio wave obtained by reflecting a radio wave transmitted from the transmission antenna by the object outside the vehicle, a detection area that is a detection target range of the object and a non-detection area that is not a detection target range of the object are set within a range of a viewing angle of the radar device, the radio wave absorber includes a first radio wave absorber and a second radio wave absorber that are disposed at only one edge of the viewing angle and arranged such that a horizontal plane of the antenna substrate is located vertically between the first radio wave absorber and the second radio wave absorber, the first radio wave absorber is disposed so as to at least partially reside within the non-detection area, and the second radio wave absorber is disposed to face the first radio wave absorber.

2. The radar device according to claim 1, wherein the first radio wave absorber and the second radio wave absorber are non-parallel to each other, and are disposed so that a first distance between the first radio wave absorber and the second radio wave absorber on a side close to the antenna substrate is larger than a second distance on a side far from the antenna substrate.

3. The radar device according to claim 2, wherein the radio wave absorber further includes a third radio wave absorber between the first radio wave absorber and the second radio wave absorber, and the third radio wave absorber connects the first radio wave absorber and the second radio wave absorber.

4. The radar device according to claim 1, wherein a width of the second radio wave absorber is larger than a width of the first radio wave absorber when viewed from a front of the vehicle.

5. The radar device according to claim 1, wherein the first radio wave absorber is disposed in a direction in which a direction of reflecting the radio wave transmitted from the transmission antenna is a direction parallel to or a direction away from a center line of the viewing angle.

6. The radar device according to claim 1, wherein the first radio wave absorber is disposed so that a direction in which the radio wave transmitted from the transmission antenna is reflected is parallel to the antenna substrate, and the second radio wave absorber is disposed parallel to a center line of the viewing angle.

7. The radar device according to claim 1, wherein the second radio wave absorber is disposed in a direction in which an absorption amount of the radio wave reflected by the first radio wave absorber is maximized.

* * * * *